United States Patent
Nashery et al.

(10) Patent No.: US 9,360,131 B2
(45) Date of Patent: Jun. 7, 2016

(54) ACTUATOR ADAPTER PLATE

(75) Inventors: Khashayar A. Nashery, Dallas, TX (US); Douglas J. Scheffler, McKinney, TX (US); Roy Ronald Pelfrey, Sherman, TX (US); Jeffrey Sexton, McKinney, TX (US)

(73) Assignee: EMERSON PROCESS MANAGEMENT REGULATOR TECHNOLOGIES, INC., McKinney, TX (US)

( * ) Notice: Subject to any disclaimer, the term of this patent is extended or adjusted under 35 U.S.C. 154(b) by 844 days.

(21) Appl. No.: 13/043,320

(22) Filed: Mar. 8, 2011

(65) Prior Publication Data

US 2011/0247701 A1 Oct. 13, 2011

Related U.S. Application Data

(60) Provisional application No. 61/322,731, filed on Apr. 9, 2010.

(51) Int. Cl.
*F16K 31/52* (2006.01)

(52) U.S. Cl.
CPC .............. *F16K 31/521* (2013.01); *F16K 31/522* (2013.01); *Y10T 137/0491* (2015.04)

(58) Field of Classification Search
CPC ..... F16K 27/06; F16K 5/0647; F16K 31/522; F16K 31/52
USPC ........... 251/214, 231, 289, 291, 292, 279, 58, 251/235; 137/15.18, 271, 270; 248/645, 248/357
See application file for complete search history.

(56) References Cited

U.S. PATENT DOCUMENTS 3,317,179 A * 5/1967 Willis ............................ 251/58
3,318,171 A   5/1967 Wilkinson et al.
(Continued)

FOREIGN PATENT DOCUMENTS

| GB | 650280 A | 2/1951 |
|----|----------|--------|
| JP | 3-57581 U | 6/1991 |
| JP | 11-51245 A | 2/1999 |

OTHER PUBLICATIONS

First Office Action for Chinese Application No. 201180001605.7, dated Dec. 27, 2013.
International Preliminary Report on Patentability for Application No. PCT/US2011/027952, dated Oct. 9, 2012.
International Search Report and Written Opinion for Application No. PCT/US2011/027952, dated Jun. 20, 2011.

(Continued)

*Primary Examiner* — John K Fristoe, Jr.
*Assistant Examiner* — Andrew J Rost
(74) *Attorney, Agent, or Firm* — Marshall, Gerstein & Borun LLP

(57) ABSTRACT

A valve assembly for use in a piping system includes a valve having an inlet and outlet arranged for connection to the piping system, and further includes a valve body, a control element disposed in a flow passage, and a shiftable valve stem operatively coupled to the control element. Valve packing is disposed about the valve stem and is secured by a retainer assembly. An adapter plate is provided and is attached to the valve body by a plurality of gland bolts, with the adapter plate and the gland bolts cooperating to secure the retainer assembly. An actuator bracket is provided and includes a first portion and a second portion, with the first portion secured to the adapter plate by a plurality of fasteners, and an actuator is secured to the second portion of the actuator bracket by a plurality of fasteners, with the actuator having a control rod operatively coupled to the valve stem.

15 Claims, 5 Drawing Sheets

(56) References Cited

U.S. PATENT DOCUMENTS

| | | | | |
|---|---|---|---|---|
| 3,807,245 | A | * | 4/1974 | Sheppard .................... 74/102 |
| 4,719,939 | A | * | 1/1988 | Killian .................... 137/315.35 |
| 5,007,613 | A | * | 4/1991 | Barker et al. .................... 251/58 |
| 5,476,117 | A | * | 12/1995 | Pakula .................... 137/312 |
| 5,564,461 | A | * | 10/1996 | Raymond et al. ........ 137/315.35 |
| 5,988,205 | A | * | 11/1999 | Eggleston ................ 137/315.35 |
| 6,135,417 | A | * | 10/2000 | Wadsworth et al. .......... 251/291 |
| 6,748,967 | B1 | * | 6/2004 | Smiltneek ................ 137/315.17 |
| 8,262,057 | B2 | * | 9/2012 | Lin et al. .................... 251/58 |

OTHER PUBLICATIONS

Notice of Reasons for Rejection for Japanese Application No. 2013-503753, dated Oct. 20, 2014.
Second Office Action issued in Chinese Application No. 201180001605.7, dated Sep. 24, 2014.
Examination Report for GCC Patent Application Application No. 2011-18146, dated Dec. 2, 2014.
Office Action for Russian Patent Application No. 2012145782, dated Feb. 20, 2015.

* cited by examiner

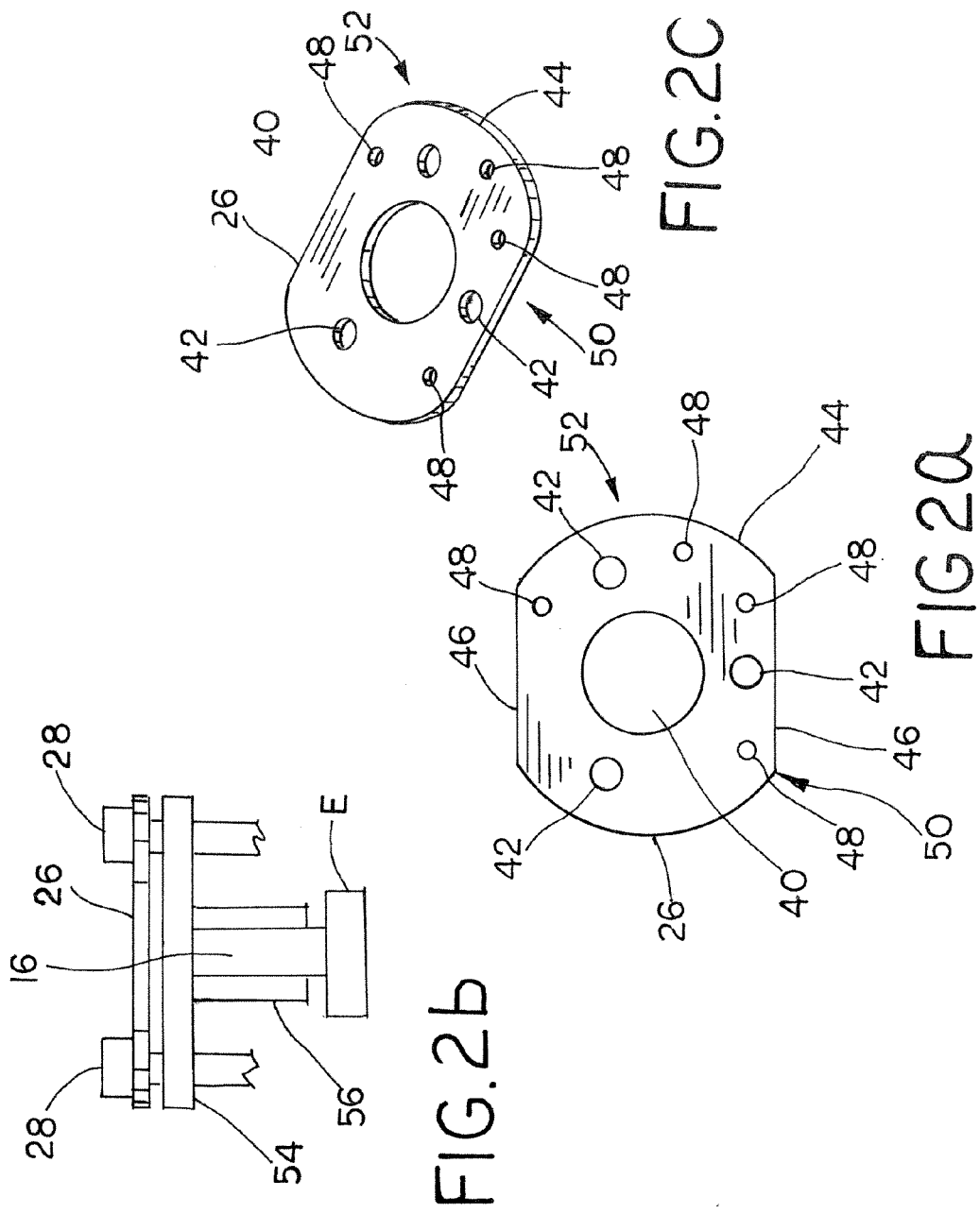

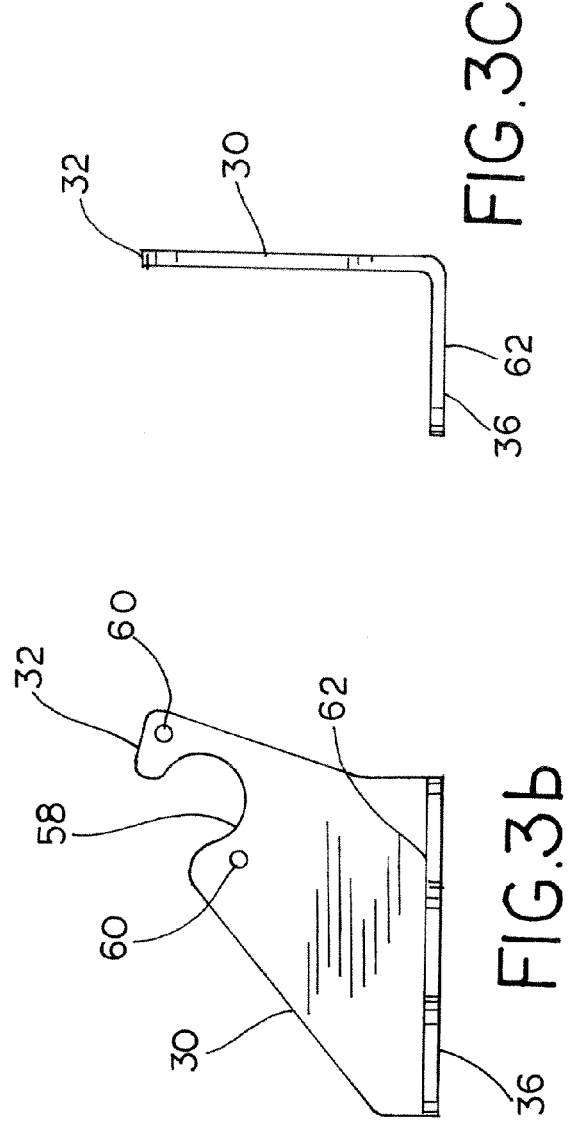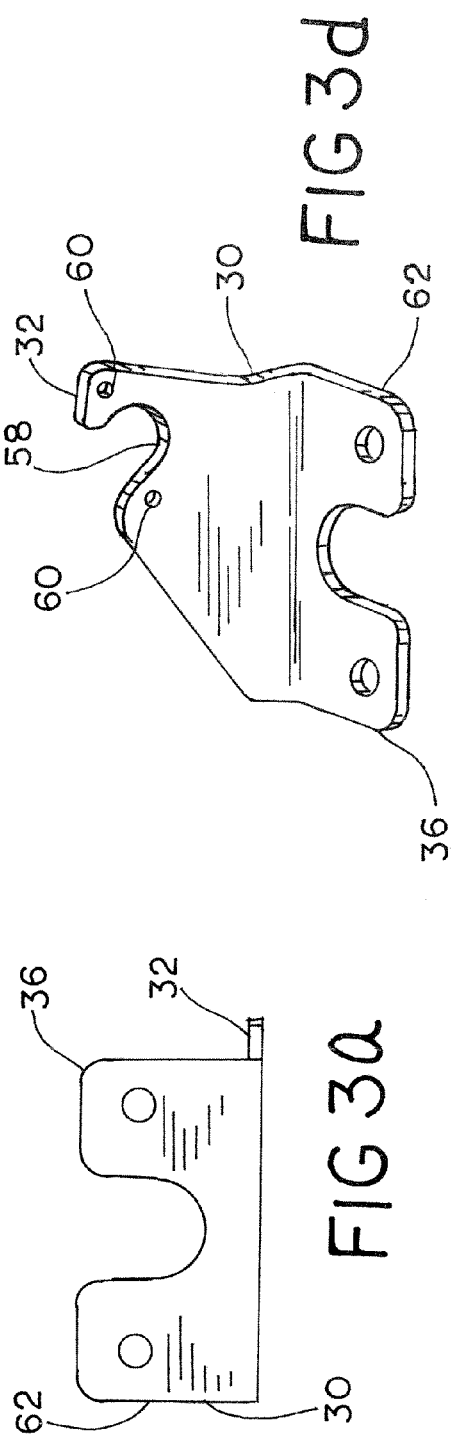

ACTUATOR ADAPTER PLATE

FIELD OF THE INVENTION

The present invention relates generally to valves having a valve body and an actuator coupled to the valve body by an actuator bracket.

BACKGROUND OF THE INVENTION

Many valves, such as process control valves, threaded internal valves, or regulators, require actuators to position a control element inside the valve in a desired position, which in turn allows the control element to control the flow of a process fluid through the valve. In many applications, the actuator is mounted directly to the valve body, or to any other suitable portion of the valve assembly, using an actuator bracket. As is known, such valves are typically positioned in a piping system using threaded couplings.

Such valves include movable valve stems which, depending on the application, either slide along an axis or rotate relative to an axis. The valve stem is surrounded by valve packing which is typically held in place by a packing retainer plate. The packing retainer plate in turn is secured to the valve body or other suitable portion of the valve assembly by a plurality of gland bolts.

An actuator bracket facilitates the attachment of the actuator to the valve. Typically, the actuator bracket is attached to the valve or valve assembly using the same gland bolts that secure the packing retainer plate. When a new valve is inserted into an existing system, the actuator must be removed from the valve assembly. However, the process of removing the actuator and reinstalling the actuator on the new valve requires field personnel to loosen the gland packing bolts. This step may require evacuation of the piping system, which necessarily would require venting to the atmosphere a process fluid such as, for example, propane or ammonia. This step also may interfere with the valve packing that surrounds the valve stem.

SUMMARY OF THE INVENTION

In accordance with an aspect of the invention, a valve assembly for use in a piping system includes a valve having an inlet and outlet arranged for connection to the piping system, and further includes a valve body, a control element disposed in a flow passage, and a shiftable valve stem operatively coupled to the control element. Valve packing is disposed about the valve stem and is secured by a retainer assembly. An adapter plate is provided and is attached to the valve body by a plurality of gland bolts, with the adapter plate and the gland bolts cooperating to secure the retainer assembly. And actuator bracket is provided and includes a first portion and a second portion, with the first portion secured to the adapter plate by a plurality of fasteners, and an actuator is secured to the second portion of the actuator bracket by a plurality of fasteners, with the actuator having a control rod operatively coupled to the valve stem.

In accordance with one or more preferred forms, the adapter plate may include a plurality of actuator bracket mounting apertures, with the actuator bracket mounting apertures arranged on the adapter plate to permit the actuator bracket to be mounted to the adapter plate in either a first position or a second position. The first portion of the actuator bracket may include a cutout sized to provide an access opening to at least one of the gland bolts.

In accordance with another exemplary aspect, a valve assembly for use in a piping system includes a valve having an inlet and outlet arranged for connection to the piping system, with the valve further including a valve body, a control element disposed in a flow passage, and a shiftable valve stem operatively coupled to the control element. Valve packing is disposed about the valve stem and secured by a retainer assembly and a plurality of gland bolts, and at least a portion of the valve body generally adjacent the retainer assembly includes a plurality of adapter apertures. And actuator bracket includes a first portion and a second portion, with the first portion secured to the adapter apertures by a plurality of fasteners. An actuator is secured to the second portion of the actuator bracket by a plurality of fasteners, and a control rod of the actuator is operatively coupled to the valve stem.

In accordance with further exemplary aspects, the plurality of adapter apertures may be arranged in a first pattern and a second pattern, with the first pattern arranged to support the first portion of the actuator bracket in a first position, and with the second pattern arranged to support the first portion of the actuator bracket in a second position. The first portion of the actuator bracket includes a cutout sized to provide an access opening or clearing space to at least one of the gland bolts, such that there is no interference between the actuator bracket and a gland bolts.

BRIEF DESCRIPTION OF THE DRAWINGS

FIG. 2a is an enlarged elevational view of an adapter plate assembled in accordance with the teachings of the present invention.

FIG. 2b is an enlarged edge view of the adapter plate of FIG. 2a, and also illustrates a portion of the valve stem, associated valve packing, and the retainer plate in fragmentary cross-sectional form.

FIG. 2c is a perspective view of the exemplary adapter plate of FIGS. 2a and 2b.

FIG. 3a is an enlarged elevational view of an actuator bracket assembled in accordance with the teachings of the present invention and for use with the adapter plate of FIGS. 2a-2c.

FIG. 3b is an enlarged top view of the actuator bracket of FIG. 3a.

FIG. 3c is an enlarged side view of the exemplary actuator bracket of FIGS. 3a and 3b.

FIG. 3d is an enlarged perspective view of the exemplary actuator bracket of FIGS. 3a-3c.

DETAILED DESCRIPTION OF THE DISCLOSED EXAMPLE

Figure 1:
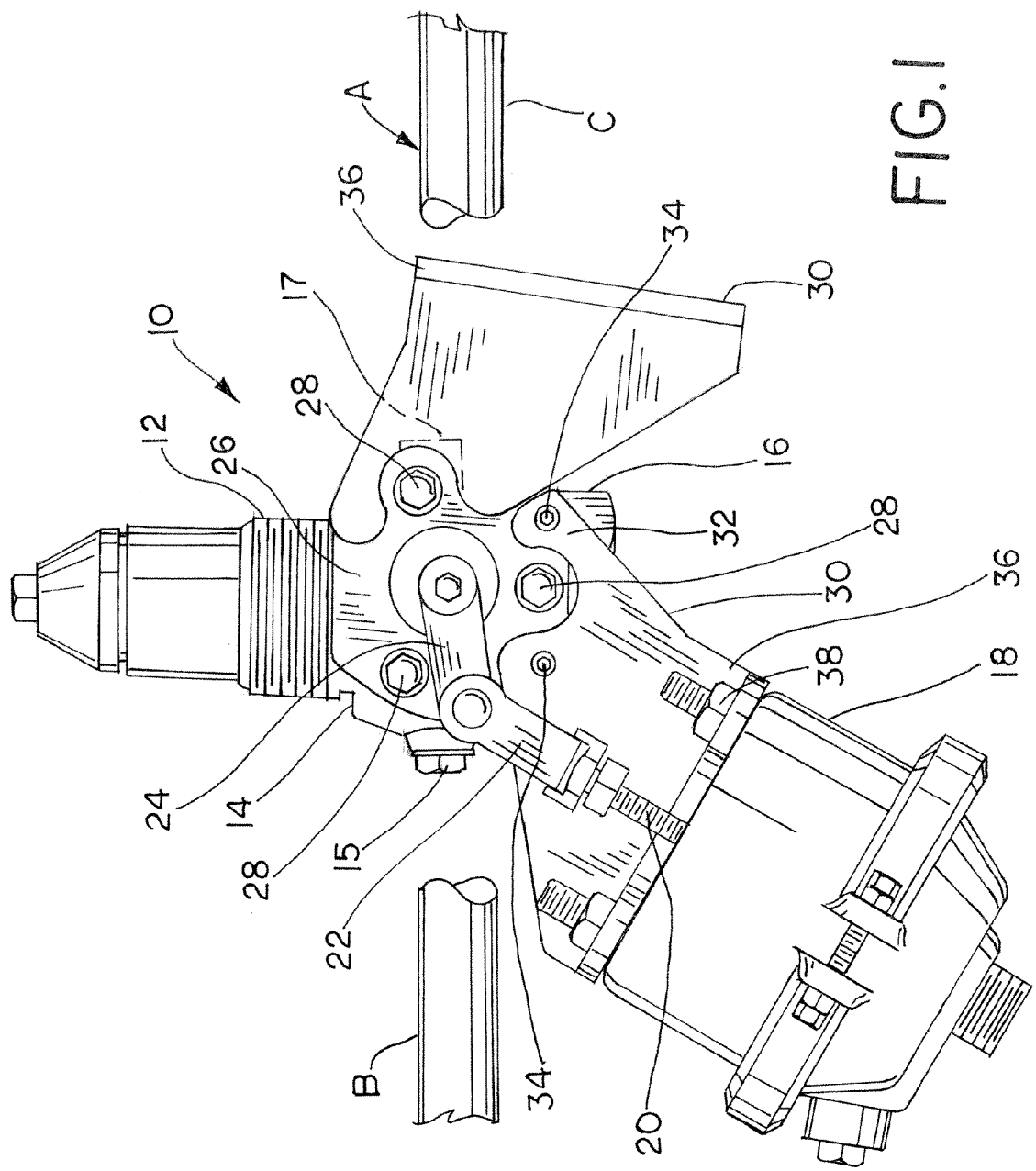
FIG. 1 is an elevational view of an internal valve suitable for use in a piping system and having an actuator attached to the valve using an actuator bracket and adapter plate assembled in accordance with the teachings of a first disclosed example of the present invention.

Referring now to the drawings, FIG. 1 illustrates a valve assembly 10 for use in a piping system A for carrying a process fluid and having sections B and C (sections B and C are truncated) that would typically extend to the left and to the right when viewing the drawing. The valve assembly 10 includes a valve 12 having a valve body 14 and a valve stem 16 (the valve stem extends into the plane of the Figure, and thus only the axial end of the valve stem 16 is visible in FIG. 1). The valve body 14 includes an inlet 15 connected to the section B and an outlet 17 connected to the section C. Alternatively, the inlet and outlet may be on different sides from that shown. The valve stem 16 is connected or otherwise suitably operatively coupled to a control element disposed inside the valve 12. As would be known to those of skill in the art, the control element controls the flow of a process fluid through the piping system, and the position of the control element is dictated by the position of the valve stem 16. The valve assembly can also include an actuator 18 having a control rod 20. The control rod 20 may include a clevis and pin assembly 22 which allows the control rod 20 to be operatively coupled to a lever arm 24 or other suitable connector, which in turn is connected to the valve stem 16.

An adapter plate 26 assembled in accordance with the teachings of a disclosed example of the present invention is shown, and is attached to the valve body 14 using a plurality of gland bolts 28. Preferably, the gland bolts 28 are the same bolts used to hold down a retainer plate (the retainer plate is obscured in FIG. 1 by the adapter plate). The retainer plate in turn secures the valve packing (not shown) which surrounds the valve stem 16. The valve assembly 10 also includes an actuator bracket 30 (actually, two actuator brackets are shown in FIG. 1, with the actuator bracket toward the right of the Figure shown to illustrate that the actuator bracket 30 maybe attached to the adapter plate 26 in more than one position or orientation). In the example shown, the actuator bracket 30 includes a first portion 32 secured to the adapter plate 26 by a plurality of fasteners 34. The adapter plate 26 also includes a second portion 36, and the actuator 18 is secured to the second portion 36 by a plurality of fasteners 38.

Figure 4:
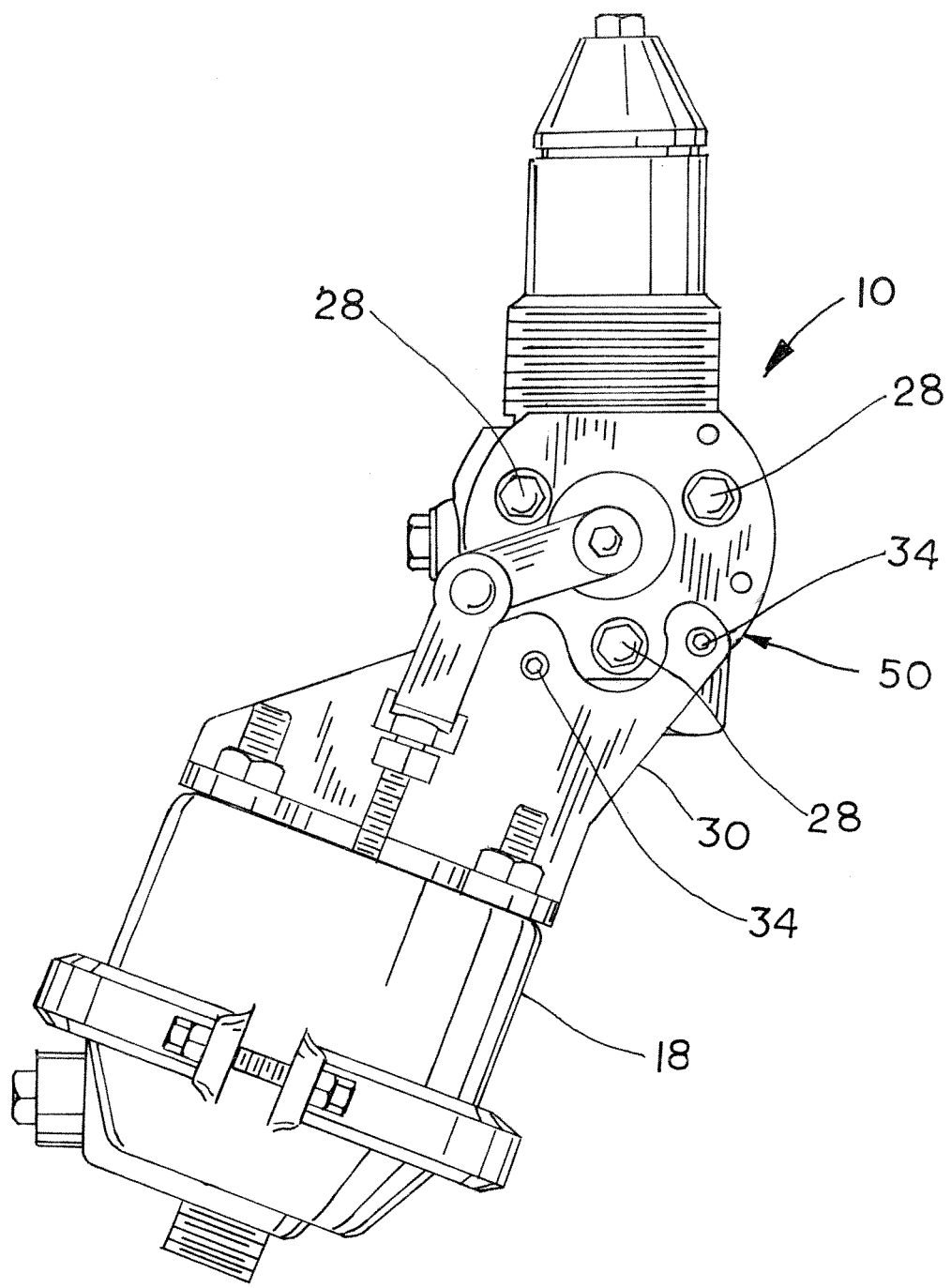
FIG. 4 illustrates the valve assembly of FIG. 1 with the actuator and actuator bracket mounted to the valve body/adapter plate in a first orientation.
Figure 5:
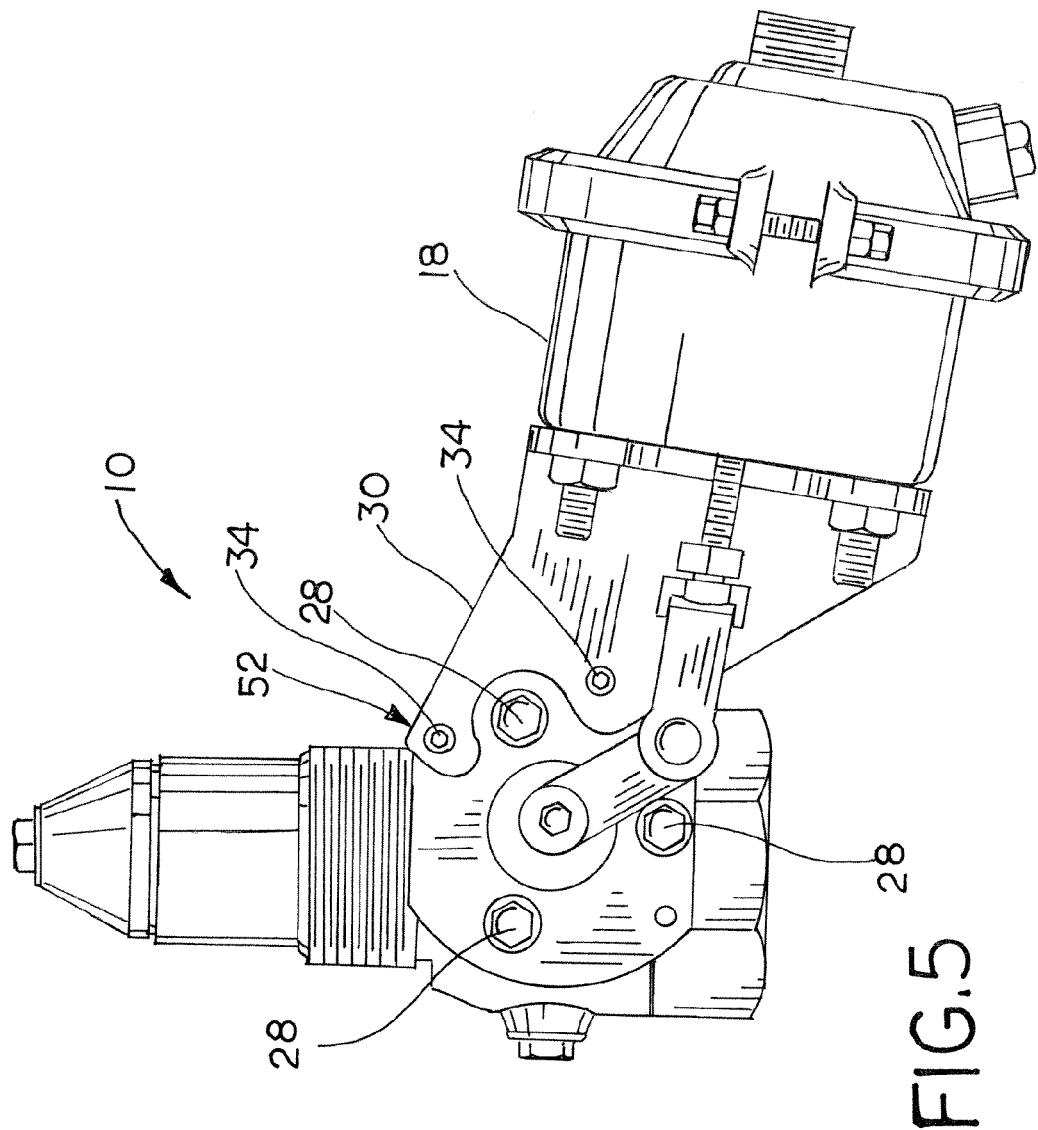
FIG. 5 illustrates the valve assembly of FIG. 1 with the actuator and actuator bracket mounted to the same valve body/adapter plate in a second orientation different than the first orientation.

Referring now to FIGS. 2a-2c, the adapter plate 26 includes a central aperture 40 sized to fit around the valve stem 16 outlined above. The adapter plate 26 includes a plurality of mounting apertures 42 sized to receive a gland bolt 28 in order to permit attachment of the adapter plate 26 to the valve body 14. The adapter plate 26 includes an outer edge 44 which may include one or more shaped edges 46 which may be sized and shaped to provide clearance with adjacent items (not shown). The adapter plate also includes a plurality of mounting apertures 48. Each of the mounting apertures 48 spans and intervening aperture 42, such that the mounting apertures 48 form a first pattern 50 and a second pattern 52. Additional apertures may be provided in order to form still further patterns. The first and second patterns 50 and 52 are arranged on the adapter plate 26 to permit the actuator bracket 30 to be mounted to the adapter plate 26 in a variety of positions. For example, as shown in FIG. 4, when choosing or selecting the first pattern 50 the bracket/actuator can be mounted in the first position of FIG. 4, while when choosing or selecting the second pattern 52 the bracket/actuator can be mounted in the second position of FIG. 5.

Referring now to FIG. 2b, the adapter plate 26 is shown positioned over a retainer plate 54 and secured by the gland bolts 28. The valve packing 56 is shown and positioned about the valve stem 16 and a known manner. It will be appreciated that a control element E coupled to the valve stem 16, the retainer plate 54, and the valve packing 56 are shown only schematically in FIG. 2b.

Referring now to FIGS. 3a-3d, the actuator bracket 30 is shown in greater detail. The first portion 32 of the actuator brackets 30 includes a cutout 58 which is disposed generally between a pair of mounting apertures 60. The cutout 58 is sized to provide a clearance space or an access opening in order to provide access to the gland bolts 28 that secure the adapter plate 26 to the valve body 14. The apertures 60 are sized, spaced, and positioned to receive the fasteners 34 to permit attachment of the actuator brackets 30 to the mounting apertures 48 in the adapter plate 26, such as in any one of the selected positions shown in FIGS. 1. 4 and 5. In the example shown, the second portion 36 of the actuator bracket 30 is in the form of a flange 62 disposed at a roughly 90° angle relative to a plane of a central portion 64 of the actuator brackets 30. The flange 62 may be disposed at any other suitable angle as dictated by surrounding environmental conditions.

The above-described adapter plate 26 may be readily applied to a variety of internal valves as well as other valves and/or regulators. In accordance with the disclosed example, the adapter plate 26 may allow a user to quickly and easily mount an actuator to a valve without disturbing the valve packing that surrounds the valve stem. The exemplary adapter plate 26 may achieve this result because the adapter plate and its associated gland bolts do not have to be removed in order to attach or detach the actuator. Furthermore, the disclosed adapter plate allow the user to place the actuator in more than one position using the same actuator bracket. This is due at least in part to the fact that the actuator bracket is integral with or otherwise coupled to the actuator itself, and is different than the adapter plate that forms the platform for the attachment of the actuator bracket.

Prior to the development of the present disclosed example, users were required to loosen the gland packing retainer plate bolts, which with the same bolts used for holding an actuator on the internal valve. An adapter plate assembled in accordance with the teachings of the disclosed example allows the user to quickly dismount or remount the actuator without disturbing the internal valve gland packing. With or without the disclosed actuator plate, an attached actuator must be removed during the installation of a threaded internal valve, which is currently a great inconvenience since the process of installing and removing the actuator results in the user having to also loosen the gland packing which in many cases would require the process fluid in the piping system (Propane or Ammonia, for example) to be evacuated. The exemplary adapter plate disclosed herein facilitates a quick dismounting and remounting of the actuator without having to loosen the valve gland packing, and therefore the user would neither have to evacuate the system piping nor would they have to disturb the valve gland packing. Additionally, any advantages potentially achievable using the exemplary forms outlined herein may bring a level of convenience and efficiency that will allow operators and users to experience greater value and reduced cost when installing a preassembled valve-actuator combination.

As an alternative, one or more aspects of the above-described adapter plate could be integrated in the cast gland retainer plate. Such an alternative would make it possible to achieve one or more of the foregoing functional advantages without providing a separate component.

Preferred embodiments of this invention are described herein, including the best mode or modes known to the inventors for carrying out the invention. Although numerous examples are shown and described herein, those of skill in the art will readily understand that details of the various embodiments need not be mutually exclusive. Instead, those of skill in the art upon reading the teachings herein should be able to combine one or more features of one embodiment with one or more features of the remaining embodiments. Further, it also should be understood that the illustrated embodiments are exemplary only, and should not be taken as limiting the scope of the invention. All methods described herein can be performed in any suitable order unless otherwise indicated herein or otherwise clearly contradicted by context. The use of any and all examples, or exemplary language (e.g., "such as") provided herein, is intended merely to better illuminate the aspects of the exemplary embodiment or embodiments of the invention, and do not pose a limitation on the scope of the invention. No language in the specification should be construed as indicating any non-claimed element as essential to the practice of the invention.

What is claimed:

1. A method of servicing a valve assembly in a piping system, the method comprising:
    providing a valve having an inlet and outlet in flow communication with the piping system, the valve further including a valve body, a control element disposed in a flow passage, a shiftable valve stem operatively coupled to the control element, and valve packing disposed about the valve stem and secured by a retainer assembly and a plurality of gland bolts;
    providing at least a portion of the valve body generally adjacent the retainer assembly with a plurality of adapter apertures;
    providing an actuator bracket having a first portion and a second portion that extends generally perpendicular to the first portion of the actuator bracket, and securing the first portion to the adapter apertures by a plurality of fasteners;
    providing an actuator secured to the second portion of the actuator bracket by a plurality of fasteners, the actuator having a control rod operatively coupled to the valve stem, the control rod having a longitudinal axis that is generally perpendicular to a longitudinal axis of the valve stem; and
    removing the actuator, including removing the plurality of fasteners securing the first portion of the actuator bracket to the adapter apertures, while maintaining a process fluid in the piping system.

2. The method of claim 1, arranging the plurality of adapter apertures in a first pattern and a second pattern, the first pattern arranged to support the first portion of the actuator bracket in a first position, the second pattern arranged to support the first portion of the actuator bracket in a second position, and selecting the first pattern or the second pattern when initially attaching the actuator bracket to the valve body.

3. The method of claim 1, including providing the first portion of the actuator bracket with a cutout sized to provide an access opening to at least one of the gland bolts.

4. The method of claim 1, wherein the control rod of the actuator is operatively coupled to the valve stem through a clevis and pin.

5. A valve assembly for use in a piping system and comprising:
    a valve having an inlet and outlet arranged for connection to the piping system, the valve further including a valve body, a control element disposed in a flow passage, and a shiftable valve stem operatively coupled to the control element;
    valve packing disposed about the valve stem and secured by a retainer assembly;
    an adapter plate overlying the retainer assembly and attached to the valve body by a plurality of gland bolts, the adapter plate and the gland bolts cooperating to secure the retainer assembly;
    an actuator bracket having a first portion and a second portion, the first portion secured to the adapter plate by a plurality of fasteners;
    an actuator secured to the second portion of the actuator bracket by a plurality of fasteners, the actuator having a control rod operatively coupled to the valve stem; and
    wherein the adapter plate includes a plurality of actuator bracket mounting apertures arranged in a first pattern and a second pattern, the first and second patterns arranged to permit the actuator bracket to be mounted on the adapter plate in either a first position or a second position, thereby permitting the actuator to be mounted in either a first position or a second position relative to the valve body; and
    wherein the adapter plate and the actuator bracket cooperate to permit the actuator bracket to be dismounted from and remounted to the valve body without disturbing the valve packing.

6. The valve assembly of claim 5, wherein the first portion of the actuator bracket includes a cutout sized to provide an access opening to at least one of the gland bolts.

7. The valve assembly of claim 6, wherein the cutout is sized and positioned to provide the access opening to the at least one of the gland bolts when the actuator bracket is attached to the valve body and the actuator is attached to the actuator bracket.

8. The valve assembly of claim 5, wherein the gland bolts engage only the adapter plate and the valve body.

9. The valve assembly of claim 5, wherein a longitudinal axis of the control rod is generally perpendicular to a longitudinal axis of the valve stem.

10. The valve assembly of claim 5, wherein the first portion of the actuator bracket is generally perpendicular to the second portion of the actuator bracket.

11. The valve assembly of claim 5, wherein the control rod of the actuator is operatively coupled to the valve stem through a clevis and pin.

12. An adaptive assembly for use with a valve and actuator assembly, the valve and actuator assembly including a valve, a valve stem surrounded by valve packing, and an actuator, the adaptive assembly comprising:
    an adapter plate securable to a valve body of the valve and sized to permit passage of the valve stem through the adapter plate, the adapter plate arranged to receive a plurality of gland bolts attachable to the valve body;
    the adapter plate overlying and securing a retainer plate to the valve body, the retainer plate operatively coupled to and applying a compressive force to the valve packing;
    an actuator bracket having a first portion and a second portion that extends generally perpendicular to the first portion of the actuator bracket, the first portion secured to the adapter plate by a plurality of fasteners;
    the second portion of the actuator bracket arranged to receive an actuator using a plurality fasteners to permit a control rod of the actuator to be operatively coupled to the valve stem, the control rod having a longitudinal axis that is generally perpendicular to a longitudinal axis of the valve stem; and
    wherein the adaptive assembly is arranged to permit the actuator bracket to be dismounted from and remounted to the valve body without disturbing the valve packing.

13. The adaptive assembly of claim 12, wherein the adapter plate includes a plurality of actuator bracket mounting apertures arranged in a first pattern and a second pattern, the first and second patterns arranged on the adapter plate to permit the actuator bracket to be mounted to the adapter plate in either a first position or a second position, thereby permitting the actuator to be mounted in either a first position or a second position relative to the valve body.

14. The adaptive assembly of claim 13, wherein the first portion of the actuator bracket includes a cutout sized to provide an access opening to at least one of the gland bolts.

15. The valve assembly of claim 12, wherein the control rod of the actuator is operatively coupled to the valve stem through a clevis and pin.

\* \* \* \* \*